United States Patent
Weber et al.

(10) Patent No.: US 8,621,381 B1
(45) Date of Patent: Dec. 31, 2013

(54) SYSTEM AND METHOD FOR ADAPTIVE USE OF KEYBOARD OR SEARCH TERM BASED ON RECENT USE

(75) Inventors: Arnaud Claude Weber, Saratoga, CA (US); Alex Neely Ainslie, San Francisco, CA (US); Roma Rajni Shah, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/478,044

(22) Filed: May 22, 2012

(51) Int. Cl.
*G06F 3/048* (2013.01)

(52) U.S. Cl.
USPC .......................................... 715/773; 715/812

(58) Field of Classification Search
USPC ................................................ 715/773, 812
See application file for complete search history.

(56) References Cited

U.S. PATENT DOCUMENTS

| | | | |
|---|---|---|---|
| 6,323,884 B1 * | 11/2001 | Bird et al. | 715/810 |
| 7,114,130 B2 * | 9/2006 | Costea et al. | 715/805 |
| 7,372,832 B2 * | 5/2008 | Bevan et al. | 370/329 |
| 7,949,960 B2 * | 5/2011 | Roessler et al. | 715/812 |
| 2008/0249987 A1 * | 10/2008 | Ogasawara | 707/3 |
| 2008/0259039 A1 * | 10/2008 | Kocienda et al. | 345/173 |
| 2010/0231612 A1 * | 9/2010 | Chaudhri et al. | 345/684 |
| 2011/0175826 A1 * | 7/2011 | Moore et al. | 345/173 |
| 2012/0102549 A1 * | 4/2012 | Mazzaferri et al. | 726/4 |

\* cited by examiner

*Primary Examiner* — Boris Pesin
*Assistant Examiner* — Matthew Ell
(74) *Attorney, Agent, or Firm* — McDermott Will & Emery LLP

(57) ABSTRACT

Computer-implemented methods for deciding whether to display a keyboard on a touchscreen device are provided. In one aspect, a method includes receiving, on a touchscreen device, a request to load a display comprising an input field and selectable content, and determining, based on prior user behavior, the probability of whether the user will enter content into the input field or select the selectable content. The method also includes controlling whether to display a keyboard when the determined probability indicates that the user will enter content into the input field or hide the keyboard when the determined probability indicates that the user will select the selectable content. Systems and machine-readable media are also provided.

20 Claims, 5 Drawing Sheets

SYSTEM AND METHOD FOR ADAPTIVE USE OF KEYBOARD OR SEARCH TERM BASED ON RECENT USE

FIELD

The subject technology generally relates to providing input to an electronic device, and, in particular, relates to displaying an input interface on the device.

BACKGROUND

Mobile devices, such as touchscreens and tablets, have limited size displays ("viewports") as compared to desktops and laptop computers. As a result, applications for mobile devices have limited screen space to display content. For example, mobile web browsers cannot display multiple web pages at the same time within the viewport, so they often use a tabbed document interface to open separate tabbed windows ("tabs") within the web browser and display one tab at a time. When a new tab is opened on a touchscreen mobile device, the mobile web browser will allow a user to select for display a search box with a display keyboard to enter input into the search box, or suggested web pages for the user to select to load. The touchscreen device does not have enough screen space to display both the search box and the display keyboard without obstructing the display of the suggested web pages to load.

SUMMARY

According to one aspect of the disclosure, a computer-implemented method for deciding whether to display a keyboard on a touchscreen device is provided. The method includes receiving, on a touchscreen device, a request to load a display including an input field and selectable content. The method also includes determining, based on prior user behavior, the probability of whether the user will enter content into the input field or select the selectable content. The method also includes controlling whether to display a keyboard when the determined probability indicates that the user will enter content into the input field or hide the keyboard when the determined probability indicates that the user will select the selectable content.

According to another aspect of the disclosure, a system for deciding whether to display a keyboard on a touchscreen device is provided. The system includes a memory storing executable instructions. The system also includes one or more processors configured to execute executable instructions to receive, on a touchscreen device, a request to load a display in a web browser including an input field and selectable content. The system also includes one or more processors configured to execute executable instructions to determine, based on prior user behavior, the probability of whether the user will enter content into the input field or select the selectable content. The system also includes one or more processors configured to execute executable instructions to control whether to display a keyboard with the web browser when the determined probability indicates that the user will enter content into the input field or hide the keyboard with the web browser when the determined probability indicates that the user will select the selectable content.

According to a further aspect of the disclosure, a machine-readable storage medium storing machine-executable instructions for deciding whether to display a keyboard on a touchscreen device is provided. The instructions include code, which when executed by a machine, cause the machine to receive, on a touchscreen device, a request to load in a web browser a web browsing window including an input field and selectable content. The instructions also include code, which when executed by a machine, cause the machine to determine based on prior user behavior, the probability of whether the user will enter content into the input field of the web browser or select the selectable content in the web browser. The instructions also include code, which when executed by a machine, cause the machine to control whether to display a keyboard with the web browsing window when the determined probability indicates that the user will enter content into the input field or hide the keyboard when the determined probability indicates that the user will select the selectable content.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology. In the drawings.

DETAILED DESCRIPTION

Figure 1:
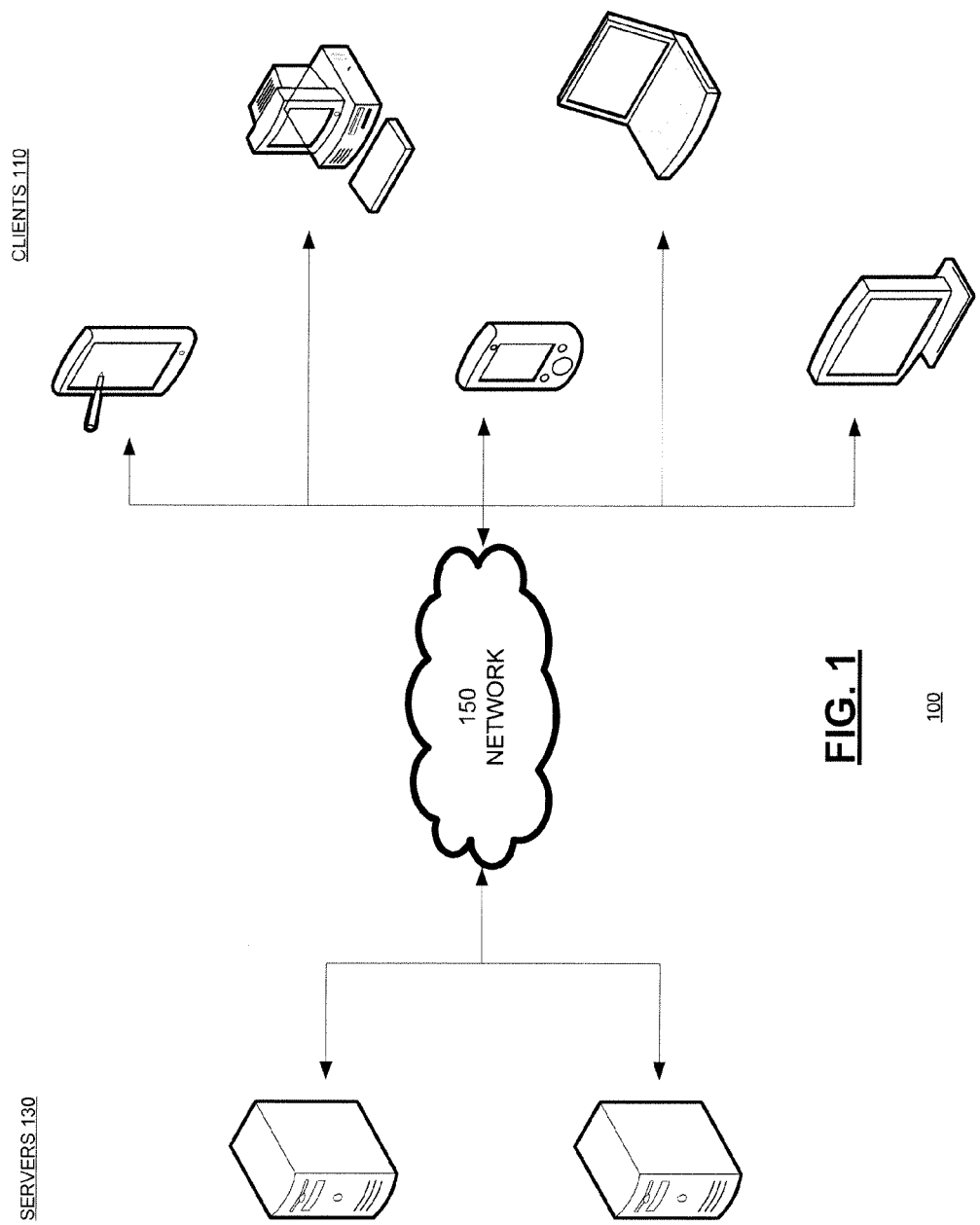
FIG. 1 illustrates an example architecture for deciding whether to display a keyboard on a touchscreen device.

The detailed description set forth below is intended as a description of various configurations of the subject technology and is not intended to represent the only configurations in which the subject technology may be practiced. It will be apparent, however, to those skilled in the art that the subject technology is not limited to the specific details set forth herein and may be practiced without these specific details. In some instances, well-known structures and components are shown in block diagram form in order to avoid obscuring the concepts of the subject technology.

Although many examples provided herein describe a user's information being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

In accordance with the subject disclosure, a system and a method are provided for adaptive use of a keyboard display based on prior user behavior. For a web browser running on a touchscreen device (e.g., a smartphone, a tablet computer, or a PDA device), the disclosed system decides whether a keyboard should be displayed based on the user's prior behavior. The user's prior behavior can relate to how the user interacted with selectable content and input fields that were previously displayed on the user's touchscreen device. The system may utilize a variety of methods to utilize data associated with the user's prior behavior to determine the probability of whether the user will enter content into the input field or select the selectable content. The system may also utilize one or more additional methods based on the user's prior behavior to determine the probability of whether the user will enter content into an input field or select the selectable content.

The system controls whether to display a keyboard when the determined probability indicates that the user will enter content into the input field, or to hide the display keyboard when the determined probability indicates that the user will select the selectable content. Where the user utilizes a web browser running on a touchscreen device to open a new tab page, the system may display a search box with the display keyboard if it determines that probability indicates that the user will enter content into the input field. Alternatively, the system may allow a list of selections to load and a search box to be displayed without the obstruction of the display keyboard if it determines that the probability indicates that the user will choose one of the selections. The system may also display the display keyboard if selectable content is not displayed on the touchscreen device.

FIG. 1 illustrates an exemplary architecture 100 for deciding whether to display a keyboard on a touchscreen device according to certain aspects of the disclosure. The architecture 100 includes servers 130 and clients 110 connected over a network 150. Clients 110 to which the servers 130 are connected over the network 150 can be, for example, touchscreen devices, tablet computers, E-Book devices, PDAs or any other device with appropriate hardware and software to run a web browser and to provide a display including an input field and selectable content in the web browser. An exemplary web browser may include one or more types of web browsing applications or one or more types of client applications.

A client 110 may contain instructions for providing the web browser running on the client 110 with a request to load a display including an input field and selectable content. The client 110 may also contain instructions for deciding whether to display a keyboard on the device 110. The client 110 may be configured to execute computer instructions to facilitate loading a display including an input field and selectable content onto the client 110. The client 110 may be further configured to control whether the display keyboard should be loaded for display on the client 110.

The client 110 may store one or more methods used to determine the probability of whether the user will enter content into the input field or select the selectable content along with data associated with prior user behavior. Prior user behavior may include, but is not limited to the user's previous action of entering content into the input field or selecting the selectable content, the number of times the user previously selected selectable content in succession, a number of times content has been entered in succession previous to the request to load the display, a number of times selection of selectable content has been made in succession previous to the request to load the display, a number of times content has been entered during a predetermined period of time prior to the request to load the display, a number of times a selection of selectable content has been made during the predetermined period of time, a total number of times content has been entered, and a total number of times a selection of selectable content has been made. The client 110 may further store data associated with prior user behavior and may transmit the data via the network 150 to the server 130.

The server 130 may include one or more actual servers. The server 130 may also represent more than one computing device working together to perform the actions of a server computer (e.g., cloud computing). In some examples, the server 130 may be coupled with various databases or storage services. Communications between clients 110 and server 130 may be facilitated through the Hypertext Transfer Protocol (HTTP). Other communication protocols may also be facilitated including e.g., Extensible Messaging and Presence Protocol (XMPP) for some or all communications between the clients 110 and server 130.

One or more servers 130 may contain instructions for providing the web browser to the client 110. A server 130 can be any device having an appropriate processor, memory, and communications capability for hosting the web browser. For purposes of load balancing, multiple servers 130 can host the web browser. The server 130 may also include a data store that may be utilized to host computer instructions.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
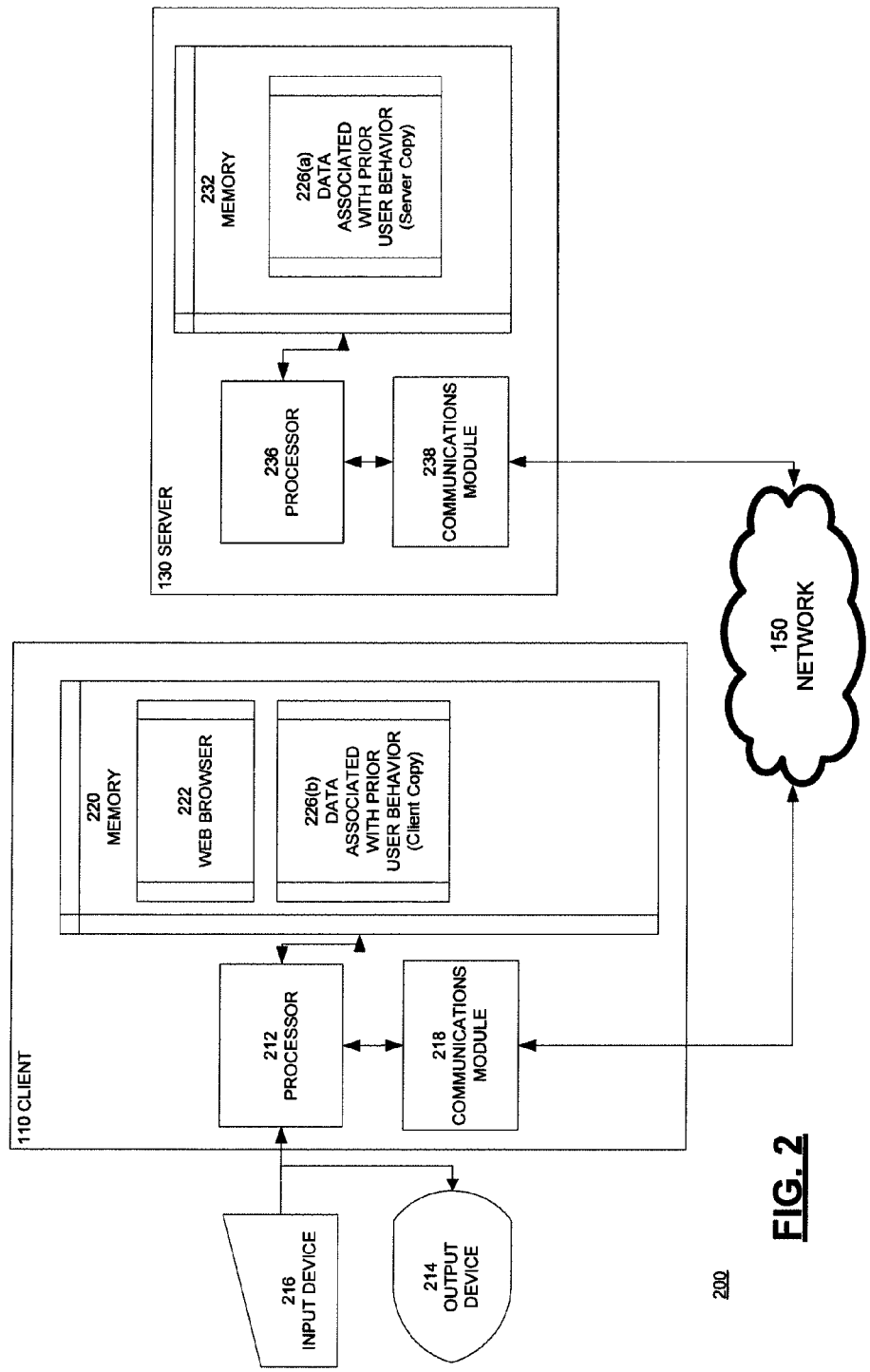
FIG. 2 is a block diagram illustrating an example client and server in the architecture of FIG. 1.

FIG. 2 is a block diagram illustrating an example client 110 and server 130 from the architecture 100 of FIG. 1 according to certain aspects of the disclosure. The server 130 includes memory 232 that may optionally contain a copy of data associated with prior user behavior, a processor 236, and a communications module 238.

The client 110 includes a processor 212, a communications module 218, and memory 220. Memory 220 includes a web browser 222 configured to display an input field and selectable content, and data related to prior user behavior 226(b). Memory 220 also contains instructions to determine the probability of whether the user will enter content into the input field or select the selectable content based on the user's prior behavior. In certain aspects, the web browser 222 is a mobile web browser configured for use with one or more types of clients 110. In other aspects, the web browser 222 is a client device application configured for use with one or more types of clients 110.

The client 110 and the server 130 are connected over the network 150 via respective communications modules 218 and 238. The communications modules 218 and 238 are configured to interface with the network 150 to send and receive information, such as data, requests, responses, user action, and commands to other devices on the network. The communications modules 218 and 238 can be, for example, modems or Ethernet cards.

Where the web browser 222 receives instructions to load a display including an input field and selectable content, the processor 212 may execute instructions to determine the probability of whether the user will enter content into the input field or select the selectable content based on data associated with prior user behavior 226(*b*). The processor 212 may further control whether the web browser 222 displays a keyboard when the determined probability indicates that the user will enter content into the input field or hide the keyboard when the determined probability indicates that the user will select the selectable content.

Where a keyboard is displayed on the user's touchscreen, the user may accept the display keyboard by utilizing the user's input device (e.g., touchscreen) to access the display keyboard. Alternatively, the user may reject the display keyboard by electing to dismiss the display keyboard. Data related to the user's action is stored in the local prior user behavior data 226(*b*) and is optionally transmitted to the server 130 through the network, where it is added to existing data related to prior user behavior 226(*a*) and will be considered to determine the probability of a future action. Similarly, where a keyboard is not displayed on the user's touchscreen, the user may accept the keyboard-less display by accessing the selectable content through the user's input device (e.g., touchscreen).

The scope of the disclosure is not limited to the aspect of the disclosure as described in FIG. 2 or described herein. Another example of the subject disclosure may contain server memory 232 that stores data associated with prior user behavior. An additional example of the subject disclosure may contain a server processor 236 that executes one or more instructions executed by the client's processor 212 as described in FIG. 2 and transmits the executed instructions and data related to the user's action to the client 110 via the network 150.

Figure 3:
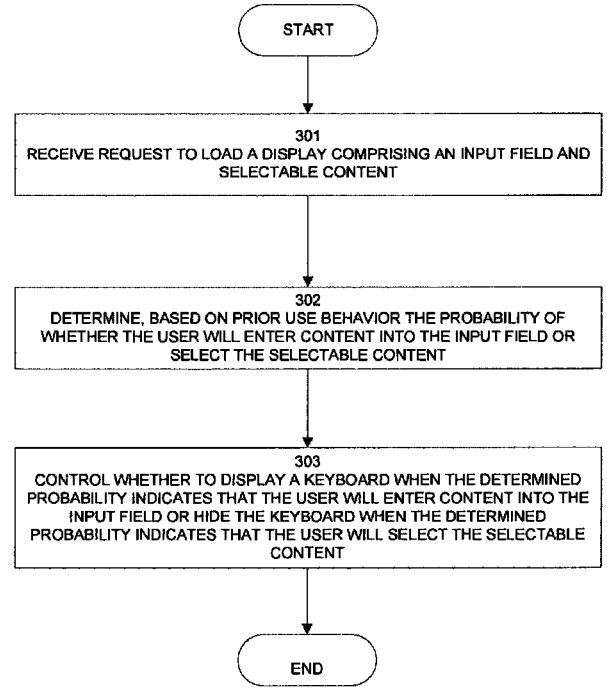
FIG. 3 illustrates an exemplary process for deciding whether to display a keyboard on a touchscreen device using the exemplary client of FIG. 2.

FIG. 3 illustrates an exemplary process for deciding whether to display a keyboard on a client 110 using the exemplary client 110 of FIG. 2 according to certain aspects of the disclosure. The client 110 receives a request to load a display including an input field and selectable content in step 301. The client's processor 212 determines, based on data associated with the user's prior behavior 226(*a*), the probability of whether the user will enter content into the input field or select the selectable content in step 302.

The client 110 may utilize a variety of methods based on the user's prior behavior to determine the probability of whether the user will enter content into the input field or select the selectable content. The probability of whether the user will enter content into the input field or select the selectable content may be determined based on the user's previous action of entering content into the input field or selecting the selectable content. The probability of whether the user will enter content into the input field or select the selectable content may also be determined by comparing a number of times content has been entered during a predetermined period of time prior to the request to load the display with a number of times a selection of selectable content has been made during the predetermined period of time. The probability of whether the user will enter content into the input field or select the selectable content may also be determined by a number of times content has been entered in succession previous to the request to load the display and a number of times selection of selectable content has been made in succession previous to the request to load the display. The probability of whether the user will enter content into the input field or select the selectable content may also be determined by comparing a total number of times content has been entered with a total number of times a selection of selectable content has been made.

The probability of whether the user will enter content into the input field or select the selectable content may be determined based on content of selectable content that has previously been displayed, and the user's prior response to the content of the selectable content and/or content similar to the selectable content. Where selectable content is displayed on a tab, the probability of whether the user will enter content into the input field or select the selectable content may be determined based on prior user action in response to receiving the displayed selectable content and/or selectable content similar to the displayed selectable content. For example, if the user, after viewing a particular selectable content, has consistently opened a new tab and entered content into the input field, a keyboard may be provided for the user if the user opens a new tab after the particular selectable content has been displayed on the client.

Where selectable content is displayed on one or more tabs that are open, the probability of whether the user will enter content into the input field or select the selectable content may be determined based on a number of times the displayed selectable content has been previously displayed on the electronic device. For example, if the user's most frequently visited web sites are displayed on the one or more tabs that are open, it may be likely that user would want enter content into the input field after the user opens a new tab, and a keyboard would be provided to the user if the user opens up a new tab while the user's most frequently visited web sites are displayed on the one or more tabs that are open. The client 110 may utilize a combination of one or more of the above mentioned methods, or utilize one or more additional methods based on the user's prior behavior to determine the probability of whether the user will enter content into the input field or select the selectable content.

Once the client 110 determines the user's likely course of action, the client 110 controls whether to display the keyboard when the determined probability indicates that the user will enter content into the input field or hide the display keyboard when the determined probability indicates that the user will select the selectable content in step 303. Where the client 110 determines that the user's impending action is to enter input into the search box, the keyboard will be displayed. Alternatively, where the client 110 determines that the user's impending action is to select from the selectable content, the display keyboard will remain hidden from the client 110.

Figure 4B:
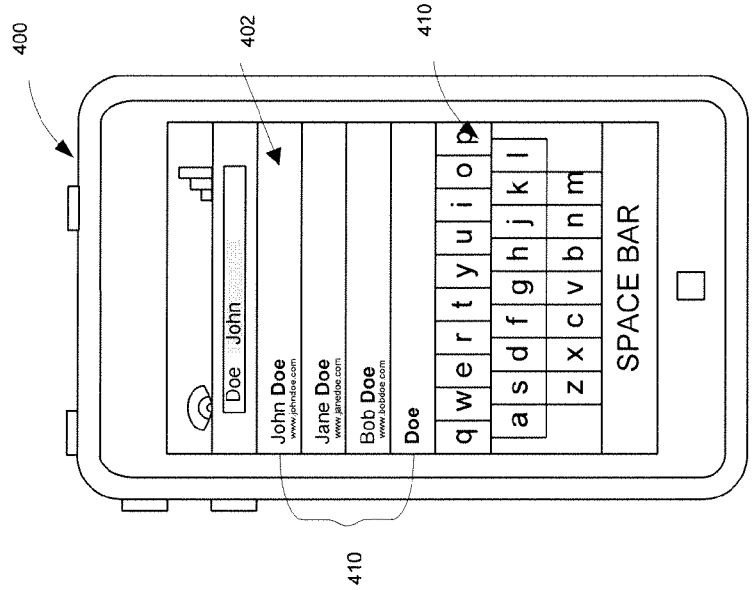
FIG. 4B illustrates an exemplary screenshot of a graphical user interface for displaying an input field with a keyboard on a touchscreen device.
Figure 4A:
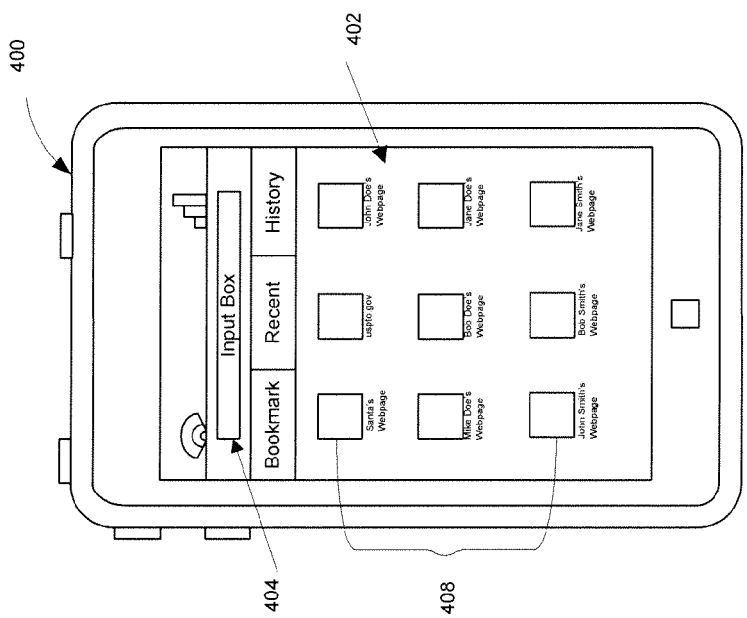
FIG. 4A illustrates an exemplary screenshot of a graphical user interface for displaying selectable content without a keyboard on a touchscreen device.

FIG. 4A illustrates an exemplary screenshot of a graphical user interface for displaying selectable content without a keyboard on a touchscreen device 400 according to certain aspects of the disclosure. Web browser software 402 running on the touchscreen device 400 provides a user interface for a display including an input field 404 and selectable content 408. The exemplary screenshot shown in FIG. 4A contains user selectable content 408 displayed on the touchscreen device's interface. The touchscreen device 400 hides the display keyboard 406 when the determined probability indicates that the user will select from selectable content. Additional examples may include different selectable content displayed in different locations with respect to the touchscreen device's display screen.

FIG. 4B illustrates an exemplary screenshot of a graphical user interface for displaying an input field with a keyboard 406 on a touchscreen device 400 according to certain aspects of the disclosure. Web browser software 402 running on the touchscreen device 400 provides a user interface for a display including an input field 404 and selectable content. In FIG.

4B, the touchscreen device 400 has determined based on prior user behavior that the user will enter content into the input field and therefore the keyboard 406 has been displayed and a list of input field suggestions 410 has been overlaid on top of the selectable content. The keyboard 406 shown in exemplary screenshot FIG. 4B is displayed on the bottom of the touchscreen device's display screen. Alternatively, the touchscreen device 400 may also provide the display keyboard if no user selectable content is displayed. Additional examples may include a different keyboard located at another location with respect to the touchscreen device's display screen.

Figure 5:
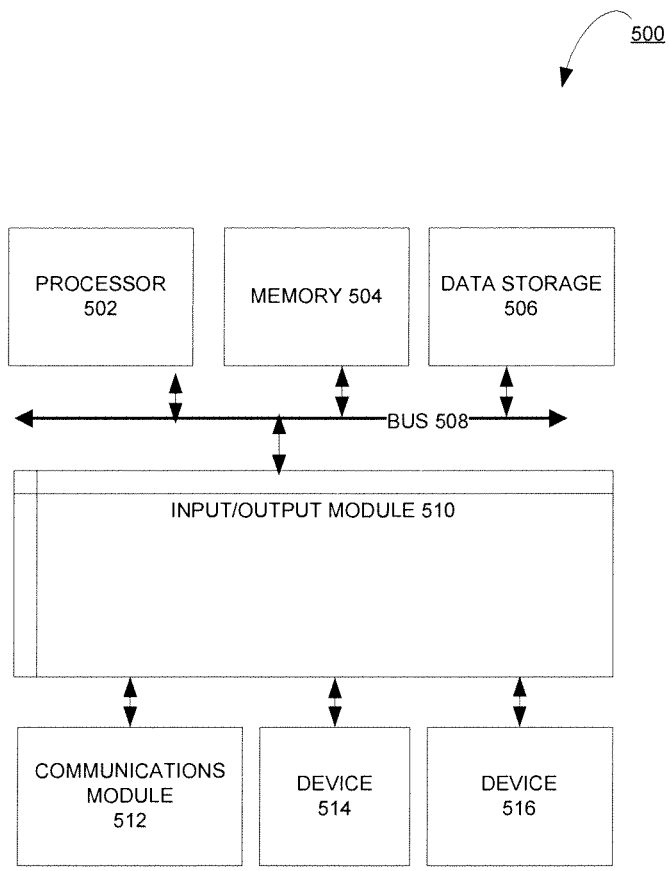
FIG. 5 is a block diagram illustrating an example computer system with which the client and server of FIG. 2 can be implemented.

FIG. 5 is a block diagram illustrating an exemplary computer system 500 with which the client 110 and server 130 of FIG. 2 can be implemented according to certain aspects of the disclosure. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a computer client device having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients 110 and servers 130. A client 110 and server 130 are generally remote from each other and typically interact through a communication network. The relationship of the client 110 and server 130 arises by virtue of computer programs running on the respective computers and having a client-server relationship to each other. Computer system 500 can be, for example, and without limitation, a touchscreen device, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method for deciding whether to display a keyboard on a touchscreen device, the method comprising:
   receiving, on a touchscreen device, a user request to open a new tab and load a display comprising an input field and selectable content on the new tab;
   determining, based on one or more selectable content items of the selectable content displayed on the touchscreen device via a tabbed window interface and prior user behavior in response to receiving content items similar to the selectable content items, the probability of whether the user will enter content into the input field or select at least one of the selectable content items;
   displaying the new tab having the input field and selectable content in response to the user request to open the new tab; and
   controlling whether to display a keyboard in the new tab when the determined probability indicates that the user will enter content into the input field, or to hide the keyboard in the new tab when the determined probability indicates that the user will select at least one of the selectable content items.

2. The computer-implemented method of claim 1, wherein the probability of whether the user will enter content into the input field or select the at least one of the selectable content items is determined based on the user's previous action of entering content into the input field or selecting selectable content.

3. The computer-implemented method of claim 1, wherein the probability of whether the user will enter content into the input field or select the at least one of the selectable content items is determined by comparing a number of times content has been entered during a predetermined period of time prior to the request to load the display with a number of times a selection of selectable content has been made during the predetermined period of time.

4. The computer-implemented method of claim 1, wherein the probability of whether the user will enter content into the input field or select the at least one of the selectable content items is determined by a number of times content has been entered in succession previous to the request to load the display and a number of times selection of selectable content has been made in succession previous to the request to load the display.

5. The computer-implemented method of claim 1, wherein the probability of whether the user will enter content into the input field or select the at least one of the selectable content items is determined by comparing a total number of times content has been entered with a total number of times a selection of selectable content has been made.

6. The computer-implemented method of claim 1, further comprising displaying the keyboard if the selectable content is not displayed.

7. The computer-implemented method of claim 1, wherein the touchscreen device comprises a smartphone device, a tablet computer, or a PDA device.

8. A system for deciding whether to display a keyboard on a touchscreen device, the system comprising:
   a memory storing executable instructions; and
   one or more processors configured to execute the executable instructions to perform operations comprising:
      receiving, on a touchscreen device, a user request to open a new tab and load a display in a web browser comprising an input field and selectable content on the new tab;
      determining, based on one or more selectable content items of the selectable content displayed on the touchscreen device via a tabbed window interface of the web browser and prior user behavior in response to receiving content items similar to the selectable content items, the probability of whether the user will enter content into the input field or select at least one of the selectable content items;
      displaying the new tab of the web browser having the input field and selectable content in response to the user request to open the new tab; and
      controlling whether to display a keyboard in the new tab of the web browser when the determined probability indicates that the user will enter content into the input field, or to hide the keyboard in the new tab of the web browser when the determined probability indicates that the user will select at least one of the selectable content items.

9. The system of claim 8, wherein the probability of whether the user will enter content into the input field or select the at least one of the selectable content items is determined based on the user's previous action of entering content into the input field or selecting selectable content.

10. The system of claim 8, wherein the probability of whether the user will enter content into the input field or select the at least one of the selectable content items is determined by comparing a number of times content has been entered during a predetermined period of time prior to the request to load the display with a number of times a selection of selectable content has been made during the predetermined period of time.

11. The system of claim 8, wherein the probability of whether the user will enter content into the input field or select the at least one of the selectable content items is determined by a number of times content has been entered in succession previous to the request to load the display and a number of times selection of selectable content has been made in succession previous to the request to load the display.

12. The system of claim 8, wherein the probability of whether the user will enter content into the input field or select the at least one of the selectable content items is determined by comparing a total number of times content has been entered with a total number of times a selection of selectable content has been made.

13. The system of claim 8, wherein the operations further comprise displaying the keyboard if the selectable content is not displayed.

14. The system of claim 8, wherein the touchscreen device comprises a smartphone device, a tablet computer, or a PDA device.

15. A non-transitory machine-readable medium storing machine-executable instructions for deciding whether to display a keyboard on a touchscreen device, which when executed by a machine, cause the machine to perform operations comprising:
   receiving, on a touchscreen device, a user request to open a new tab and load in a web browser a web browser window comprising an input field and selectable content on the new tab;
   determining, based on one or more selectable content items of the selectable content are displayed on the touchscreen device via a tabbed window interface of the web browser window and prior user behavior in response to receiving content items similar to the selectable content items, the probability of whether the user will enter content into the input field of the web browser or select at least one of the selectable content items in the web browser;
   displaying the new tab of the web browser having the input field and selectable content in response to the user request to open the new tab; and
   controlling whether to display a keyboard in the new tab of the web browser window when the determined probability indicates that the user will enter content into the input field, or to hide the keyboard in the new tab when the determined probability indicates that the user will select at least one of the selectable content items.

16. The non-transitory machine-readable medium of claim 15, wherein the probability of whether the user will enter content into the input field or select the at least one of the selectable content items is determined based on the user's previous action of entering content into the input field or selecting selectable content.

17. The non-transitory machine-readable medium of claim 15, wherein the probability of whether the user will enter content into the input field or select the at least one of the selectable content items is determined by comparing a number of times content has been entered during a predetermined period of time prior to the request to load the display with the number of times a selection of selectable content has been made during the predetermined period of time.

18. The non-transitory machine-readable medium of claim 15, wherein the probability of whether the user will enter content into the input field or select the at least one of the selectable content items is determined by a number of times content has been entered in succession previous to the request to load the display and a number of times selection of selectable content has been made in succession previous to the request to load the display.

19. The non-transitory machine-readable medium of claim 15, wherein the probability of whether the user will enter content into the input field or select the at least one of the selectable content items is determined by comparing a total number of times content has been entered with a total number of times a selection of selectable content has been made.

20. The non-transitory machine-readable medium of claim 15, wherein the operations further comprise displaying the keyboard if the selectable content is not displayed.

* * * * *

UNITED STATES PATENT AND TRADEMARK OFFICE
CERTIFICATE OF CORRECTION

Page 1 of 1

PATENT NO. : 8,621,381 B1
APPLICATION NO. : 13/478044
DATED : December 31, 2013
INVENTOR(S) : Arnaud Claude Weber et al.

It is certified that error appears in the above-identified patent and that said Letters Patent is hereby corrected as shown below:

IN THE CLAIMS:

In Column 12, Line 26

Delete "are".

Signed and Sealed this
Twenty-ninth Day of April, 2014

Michelle K. Lee
*Deputy Director of the United States Patent and Trademark Office*